United States Patent Office 3,204,001
Patented Aug. 31, 1965

3,204,001
METHOD FOR PREPARING 2,6-DICHLORO-PHENYLNITROMETHANE
Johannes Thomas Hackmann, Herne Bay, Derek Alexander Wood, Sittingbourne, and Paulus Adriaan Harthoorn, Herne Bay, England, assignors to Shell Oil Company, New York, N.Y., a corporation of Delaware
No Drawing. Filed July 12, 1962, Ser. No. 209,291
Claims priority, application Great Britain, Apr. 6, 1962, 17,800/61
3 Claims. (Cl. 260—646)

This invention relates to the novel compound, 2,6-dichlorophenylnitromethane, in both of its tautomeric pseudo-acid and aci-forms, and the novel sodium salt of the aci-form. This invention also relates to the use of these compounds for control of certain biological processes, particularly to their use as herbicides. This invention also relates to the use of such compounds as intermediates in the preparation of other valuable products.

2,6-dichlorophenylnitromethane can assume two different forms, the pseudo-acid form and the tautomeric aci-form, the two forms having somewhat different characteristics and being in labile equilibrium each with the other. The two forms can be represented by the general formulae:

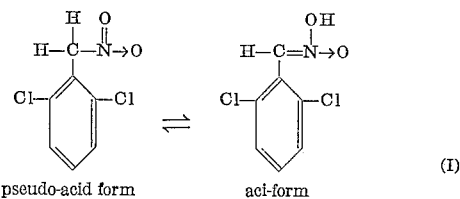

In its aci-form, 2,6-dichlorophenylnitromethane can form the sodium salt by reaction of the hydroxyl group bonded to the nitrogen atom.

At ordinary room temperatures, 2,6-dichlorophenylnitromethane consists of an equilibrium mixture of the two forms, with the pseudo-acid form predominating. In a basic medium the equilibrium is shifted in favor of the aci-form, with the formation of the salt involving reaction of the hydrogen atom of the hydroxyl group.

2,6-dichlorophenylnitromethane is advantageously prepared by reacting a 2,6-dichlorobenzyl halide with an inorganic nitrite. This process forms a further aspect of this invention.

The 2,6-dichlorobenzyl halide suitably may be the chloride, bromide or iodide, or mixtures thereof. For economic reasons, the chloride is to be preferred. 2,6-dichlorobenzyl chloride is readily prepared according to the process of copending U.S. application Serial No. 155,840, filed November 29, 1961.

The most suitable inorganic nitrites for use in the process of the invention are the alkali metal nitrites. Lithium nitrite is particularly suitable owing to its generally higher solubility in the liquid reaction media which may be used in the process of the invention. However, it is not readily available. Sodium nitrite is in general more soluble than potassium nitrite and is therefore most preferred.

The 2,6-dichlorobenzyl halide and the alkali metal nitrite may be used in equimolar amounts but it is advantageous to use an excess of the nitrite. In general, satisfactory results are obtained when a molar excess of about 10% is used but larger excesses, for example up to 70%, may be used if necessary.

The reaction between the benzyl halide and the alkali metal nitrite may be effected in absence of a liquid reaction medium but it is advantageous to employ such a medium. For this purpose, an aqueous or aqueous-alcoholic medium may be used. Preferably however the reaction is effected under anhydrous conditions using as the reaction medium an organic liquid which is a solvent for at least one, and preferably for both of the reactants, for example, ether, a mixture of ether and benzene proportioned to boil at about 50° C.; an alcohol, for example, methanol, ethanol or a glycol such as ethylene glycol; a ketone, for example, acetone or methylethylketone. Preferred solvents for use in the process of the invention are those inert organic compounds which are liquid at the reaction temperature, which are substantially inert under the reaction conditions, and which have a dielectric constant of at least 20 at 25° C., typical examples being dimethylformamide (DMF) and dimethyl sulphoxide (DMSO).

Such compounds comprise aromatic, aliphatic and cycloaliphatic radicals having electrophilic substituents which lend them their dielectric properties; mixtures thereof are suitable. Particularly preferred electrophilic substituents are the nitro radical, the amido radical, —C(O)NH$_2$, the sulfoxyl radical, >S=O, and the sulfone radical

Other examples of such compounds are N-methyl formamide, N-methyl- and N,N-dimethylacetamide, N-methylpropionamide, dimethylsulfone, as well as tetrahydrofurane and sulfolane. The preferred solvents are the N,N-di(lower alkyl)-carboxamides and the di(lower alkyl)sulfoxides, the most desirable being those wherein each of the alkyl groups, which may be the same or different, contain from 1 to 4 carbon atoms. Preferred are dimethylformamide and dimethyl sulfoxide. When dimethylformamide is used, the solubility of the alkali metal nitrite therein, particularly of sodium nitrite, can be increased by incorporating urea, suitably in an amount from 4 to 5 times the normal solubility of the nitrite in the solvent. Sodium nitrite has relatively high solubility in dimethyl sulfoxide.

The reaction of the benzyl halide with the alkali metal nitrite preferably is conducted in the presence of one or more of certain materials which will here be termed "nitrite scavengers," and which serve to avoid undesirable side-reactions which result in reduction in the yield of the desired nitromethane, without production of compounds of equal value.

The reaction of the benzyl halide with the alkali metal nitrite results not only in the formation of the desired 2,6-dichlorophenylnitromethane but also in 2,6-dichlorobenzyl nitrite. The yield of nitro compound also tends to be reduced by the action of this nitrite ester and the alkali metal nitrite on the nitro compound which is thereby nitrosated to 2,6-dichlorophenylnitrolic acid, the nitrite ester being converted to 2,6-dichlorobenzyl alcohol. The nitrolic acid may then split off nitrous acid to form 2,6-dichlorobenzonitrile oxide which may dimerise to the furoxan, or the nitrolic acid may be converted to 2,6-dichlorobenzoic acid.

Formation of the nitrite ester can be reduced by conduction the reaction of the benzyl halide and the inorganic nitrite at low temperatures—not exceeding 20° C., preferably below 0° C., particularly at —10° C. to —20° C.

While use of such low temperatures reduces the undesired side-reaction, it accomplishes it at the sacrifice of reaction time, for the reaction goes forward very slowly at such temperatures. The effect of temperature is demonstrated by the results of experiments summarized in Table I.

pyrogallol. Preferred scavengers of this type are phloroglucinol, pyrogallol and catechol which give yields of

TABLE I

| Test No. | Medium | Temperature (° C.) | Reaction time (hours) | Conversion (percent) | Mole percent yields calculated on converted benzyl chloride | |
|---|---|---|---|---|---|---|
| | | | | | Hydroxy compound | Nitro compound |
| 1a | DMF/urea | −20 | 20 | 66 | 24 | 47 |
| 1b | DMF/urea | 20 | 20 | 91 | 35 | 9 |
| 2a | DMSO | 15 | 0.25 | 95 | 33 | 22 |
| 2b | DMSO | 15 | 1 | 100 | 30 | 23 |
| 2c | DMSO | 15 | 2 | 100 | 29 | 18 |

However, if a "nitrite scavenger" is employed, higher reaction temperature can be employed, resulting in markedly shorter reaction times, yet yields of the desired nitromethane are even higher than when the low temperatures are used, no nitrite scavenger being employed.

Reaction temperatures up to about 90° C. are suitable but higher temperatures may be used provided they are not such as will cause thermal decomposition of the desired product. In this way, practically quantitative conversions of the benzyl halide may be obtained in a reaction period of one hour or less with high yields of nitro compound.

It has been found that the presence of one or more of certain compounds in the benzyl halide-alkali metal nitrite reaction mixture markedly reduces the extent of the undesired side reaction which produces the benzyl nitrite. These added compounds apparently react more readily with the benzyl nitrite than does the nitromethane, thus removing the nitrite so that it cannot react with the nitromethane. These added compounds apparently effect this desirable result without disturbing any other equilibrium in the reaction mixture—i.e., the presence of these compounds does not cause any higher production of the benzyl nitrite from the reaction of the benzyl halide and the alkali metal nitrite. The overall effect of the added compounds thus is to increase the yield of nitromethane from the benzyl halide that is converted. The added compounds accordingly are termed "nitrite scavengers."

One kind of compounds that have been found to act as nitrite scavengers are certain phenols, examples being 1-naphthol, the dihydric phenols, catechol, resorcinol and quinol and trihydric phenols such as phloroglucinol and pyrogallol. Preferred scavengers of this type are phloroglucinol, pyrogallol and catechol which give yields of nitro compound of at least 40% at conversions of at least 90%.

Preferred nitrite scavengers are the aliphatic primary and secondary amines, preferably having not more than 8 carbon atoms in the molecule. Diethylamine, n-propylamine, di-n-propylamine, n-butylamine and di-n-butylamine are particulrly effective giving yields of nitro compound of at least 40% at conversions of at least 90%. They have the advantages over the phenolic compounds in being cheaper and giving cleaner reaction mixtures. Diethylamine is particularly preferred as it gives a very clean reaction mixture from which N-nitrosodiethylamine is readily separated by distillation under reduced pressure.

Other scavengers which may be used include aromatic amines such as aniline and N,N-dimethylaniline but these tend to give highly colored reaction mixtures, or ethyl malonate, cyclohexanone or the nitropropanes but these are somewhat difficult to separate from the reaction mixture. Scavengers of these types are therefore less preferable for use in the process of the invention.

The nitrite scavenger is suitably added in the proportion of 0.3 to 1 mole per mole of benzyl halide, preferably in the proportion of 0.4 to 0.6 mole per mole of benzyl halide.

The results obtained with the preferred scavengers in the process of the invention are summarized in Table II.

TABLE II

| Test | Medium | Temperature (° C.) | Time, hours | Scavenger [1] | Conversion, mole percent | Mole percent yields calculated on converted benzyl chloride | |
|---|---|---|---|---|---|---|---|
| | | | | | | Hydroxy compound | Nitro compound |
| A | DMF/urea | 20 | 20 | | 91 | 35 | 9 |
| B | DMF/urea | 4–9 | 2.25 | Phloroglucinol | 50 | 37 | 51 |
| C | DMF/urea | 25 | 6 | do | 88 | 40 | 47 |
| D | DMF/urea | 20 | 20 | do | 82 | 36 | 43 |
| E | DMF/urea | 20 | 20 | Catechol | 90 | 34 | 43 |
| F | DMF/urea | 20 | 20 | Resorcinol | 91 | 31 | 25 |
| G | DMF/urea | 20 | 20 | Pyrogallol | 91 | 35 | 47 |
| H | DMF/urea | 50 | 1 | do | 94 | 34 | 44 |
| I | DMF/urea | 90 | 0.25 | do | 97 | 40 | 50 |
| J | DMF/urea | 20 | 20 | Quinol | 89 | 34 | 33 |
| K | DMF/urea | 20 | 4 | 1-naphthol | 92 | 38 | 39 |
| L | DMF/urea | 20 | 4 | Hexamine | 98 | 40 | 26 |
| M | DMF/urea | 20 | 4 | Diethylamine | 93 | 37 | 45 |
| N | DMF/urea | 50 | 1 | do | 100 | 40 | 44 |
| O | DMSO | 15 | 1 | do | 100 | 30 | 23 |
| P | DMSO | 15 | 2.25 | Phloroglucinol | 90 | 33 | 36 |
| Q | DMSO | 15 | 2 | Resorcinol | 94 | 28 | 19 |
| R | DMSO | [2] 50 | 1 | n-Propylamine | 100 | 38 | 47 |
| S | DMSO | [2] 50 | 1 | n-Butylamine | 100, | 36 | 43 |
| T | DMSO | [2] 51 | 2 | Diethylamine | 100 | 38 | 48 |
| U | DMSO | [2] 51 | 1 | Diethylamine (1.0 mole). | 100 | 43 | 45 |
| V | DMSO | [2] 50 | 1.25 | di-n-Butylamine | 100 | 36 | 47 |

[1] The scavengers were added in quantities of 0.5 mol per mol of benzyl chloride, except where otherwise stated.
[2] In these experiments the temperature was not kept constant but allowed to increase to temperature given.

The reaction mixture finally obtained may be worked up in various ways. Thus, it may be diluted with water and the aqueous mixtures extracted with a solvent, for example, a chlorinated hydrocarbon such as methylene dichloride, chloroform or carbon tetrachloride. Any nitrolic acid present is removed by extraction with ammonia, a solution being eventually obtained which contains 2,6-dichlorophenylnitromethane, probably also 2,6-dichlorobenzyl alcohol, a nitrosamine and small quantities of other products. This is then dried and the solvent stripped. Alternatively the reaction mixture is diluted with the solvent, precipitated inorganic material is removed and the solvent stripped from the extract.

The residue thus obtained may then be dissolved in a water-miscible solvent, for example, methylated spirit and the solution, after any necessary filtration, poured into a briskly stirred aqueous sodium hydroxide solution, a solution of the sodium salt of the aci-form of 2,6-dichlorophenylnitromethane being obtained. Other products may then be removed by extraction with a solvent and the 2,6-dichlorophenylnitromethane recovered by extraction of the acidified solution with a solvent.

Alternatively, the residue or a solution of the residue in a suitable solvent may be treated with thienyl chloride which quantitatively converts the 2,6-dichlorobenzyl alcohol into the 2,6-dichlorobenzyl chloride, which can be separated from the 2,6-dichlorophenylnitromethane by fractional distillation under reduced pressure. It is difficult to separate the 2,6-dichlorobenzyl alcohol and 2,6-dichlorophenylnitromethane by fractional distillation under reduced pressure.

The sodium salt of the aci-2,6-dichlorophenylnitromethane can be prepared by treating the nitro compound (equilibrium mixture) with sodium carbonate or hydroxide in an aqueous or alcoholic medium, or with sodium alkoxide, for example sodium ethoxide or methoxide, in presence of an alcohol, suitably excess of the alcohol from which the sodium alkoxide was prepared. The desired salt is obtained in solid form by distilling off the alcohol from the reaction mixture. If desired, the reaction may be carried out in presence of an inert diluent, for example, a hydrocarbon solvent such as benzene. The diluent used is preferably one which forms an azeotrope with the alcohol present, for example benzene. The use of, for example benzene, for removing alcohol present by azeotropic distillation is a convenient method of obtaining an alcohol-free suspension of the desired salt.

The aci-2,6-dichlorophenylnitromethane can be prepared by treating an aqueous solution of its sodium salt with an aqueous mineral acid, suitably hydrochloric acid, at about 0° C. or below. The liberated aci-compound can be separated from the reaction mixture, for example, by extraction with a solvent. Ether is a suitable solvent for this purpose since it can be readily removed from the extract under reduced pressure. The aci-compound gradually reverts to the pseudo-acid form on standing.

Preparation of the compounds of this invention by means of the process of this invention is shown in the following examples. In these examples "parts" means parts by weight unless otherwise indicated, with parts by weight bearing the same relation to parts by volume as does the kilogram to the liter.

*Example I.—Preparation of 2,6-dichlorophenyl-nitromethane*

A solution of sodium nitrite was prepared by dissolving urea (130 parts) and sodium nitrite (120 parts) in 200° parts by volume of dimethylformamide. Urea was used to increase the solubility of the sodium nitrite. All the reagents were dried prior to use. To this solution, cooled to −20° C., was added 2,6-dichlorobenzyl bromide (240 parts). The mixture was stirred for 5 hours, during which time the temperature was maintained between −15° C. and −20° C.

The product was isolated by pouring the mixture into 4000 parts by volume of water at about 0° C. and then extracting the mixture with ether. The ether extracts were washed with water, dried over sodium sulphate, the solvent removed under reduced pressure. The resulting product was distilled under high vacuum. The fraction boiling at a temperature of 110°–115° C. under a pressure of 0.5 Torr. was recrystallized from petroleum ether. Yield: 112 parts (54%) of 2,6-dichlorophenylnitromethane as colorless needles, melting at 41° C.

*Analysis* (percent by weight).—Calculated: C, 40.7; H, 2.4; Cl, 34.5. Found: C, 41.1; H, 2.7; Cl, 35.4.

The above reaction was also carried out under the same conditions but using 2,6-dichlorobenzyl chloride as starting material. The desired product was obtained in a yield of 50% the reaction being slower, conversion of the chloride was 20%.

The conversion rate and the yield (based on the starting material) are considerably increased by carrying out the reaction at elevated temperature and in the presence of diethylamine. This improved embodiment is illustrated in the following examples:

(a) 2,6-dichlorobenzylchloride (196 parts) was added to a solution of:

| | |
|---|---|
| Sodium nitrite _____parts__ | 76 |
| Urea _____do____ | 50 |
| Diethylamine _____do____ | 37 |
| Dimethylformamide _____parts by volume__ | 1,000 |

The reaction temperature rose from 25° C. to 28° C. After 4 hours the reaction mixture was poured into 5,000 parts by volume of water and the resulting mixture extracted with methylene chloride. The extract was washed with ammonia (1 N) and dried with calcium chloride. The solvent was then removed and the residue fractionally distilled. The yield of the desired nitro compound is given in Table III.

(b) The above reaction was repeated at a temperature of 50° C. for 1 hour. During the first 10 minutes of the reaction the temperature spontaneously rose to 54° C. After cooling to room temperature, the mixture was poured into 2,500 parts by volume of water. A brown oil (124.5 parts) separated which was worked up as described under (a). The yield of the desired nitro compound is also given in Table III.

(c) The above reaction was repeated with the difference that no urea was present and that the dimethylformamide was replaced by 350 parts by volume of dimethylsulphoxide. This reaction was carried out at a temperature of 50°–51° C. The reaction time required for complete conversion was 0.5–1 hour. The reaction mixture was worked up as described under (a).

TABLE III

| Solvent | Temperature (° C.) | Time (hours) | Conversion of 2,6-dichlorobenzylchloride, percent | Yield of nitro compound based on converted benzylchloride, percent |
|---|---|---|---|---|
| Dimethylformamide/urea_____ | 25–28 | 4 | 93 | 45 |
| Do_____ | 50–54 | 1 | >99 | 44 |
| Dimethylsulphoxide_____ | 50–51 | 0.5–1 | 100 | 48 |

*Example II.—Preparation of 2,6-dichlorophenyl-nitromethane*

[Test N, Table II]

2,6-dichlorobenzyl chloride, (39.2 parts) was added in one portion to a stirred solution containing:

| | |
|---|---|
| Sodium nitrite _____parts__ | 15.2 |
| Urea _____do____ | 17.6 |
| Diethylamine _____do____ | 7.3 |
| Dimethyl formamide _____parts by volume__ | 200 |

The temperature of the reaction mixture rose spontaneously during the first 5 to 10 minutes of the reaction. The reaction mixture was kept at 50° C. by heating on a waterbath for one hour. After cooling to room temperature the reaction mixture was poured into 500 parts by volume of water. A brown oil separated. The aqueous layer was extracted with methylene chloride, with water and with ammonia (1 N). The organic layer was dried with calcium chloride. The solvent was distilled off at normal pressure and the residue was distilled at 1 Torr. pressure from an oil bath gradually warmed up to 150° to 160° C.

A low boiling fraction ($<35°-40°$ C.) was N-nitrosodiethylamine ($N_D^{21}$): 1.4302; 5.1 parts. The next fraction (90° to 120° C.) was a mixture mainly of 2,6-dichlorobenzyl alcohol and 2,6-dichlorophenylnitromethane, 32.1 parts.

The composition of the distillate was assayed by gas-liquid chromatography: yield of 2,6-dichlorophenylnitromethane 44%.

*Example III.—Preparation of 2,6-dichlorophenylnitromethane*

[Test R, Table II]

2,6-dichlorobenzyl chloride (96 parts) was added to a stirred solution of sodium nitrite (76 parts) and n-propylamine 29.5 parts in dimethyl sulphoxide (350 parts by volume). There was a rapid rise in temperature, which was only controlled when it rose above 50° C. After one hour the reaction mixture was poured into water, 1500 parts by volume and extracted with methylene chloride. The organic layer was washed with water and ammonia (1 N), then dried with calcium chloride, filtered and evaporated to a low volume. The residue was distilled under 1 Torr. pressure from an oilbath, which was gradually warmed up to 150° to 160° C., yielding 163.5 parts of a distillate and 31.5 parts of a brown residue.

The distillate, which was a practically pure mixture of 2,6-dichlorobenzyl alcohol and 2,6-dichlorophenylnitromethane, was analyzed by means of gas-liquid chromatography.

*Example IV.—Preparation of 2,6-dichlorophenylnitromethane*

[Test result in Table I]

A solution was made of sodium nitrite (6.8 parts) in 39 parts by volume of warm ethylene glycol, cooled to room temperature and added to 2,6-dichlorobenzyl chloride (9.8 parts). After 24 hours stirring at 20° C. the reaction mixture was filtered. The filter residue was washed with water and dried in a vacuum desiccator. Unreacted 2,6-dichlorobenzyl chloride (6.4 parts) was recovered.

The filtrate was mixed with water-washings, further diluted with water and extracted with carbon tetrachloride. The extract was washed with water and dried on calcium chloride. The solvent was stripped off on the waterbath and the residue distilled under 1 Torr. pressure from an oilbath, the temperature of which was gradually increased to 150° to 160° C. The distillate, 1.4 parts, consisted of 51% by weight of 2,6-dichlorobenzyl chloride, 24% of 2,6-dichlorobenzyl alcohol and 24% 2,6-dichlorophenyl nitromethane.

*Example V.—Preparation of 2,6-dichlorophenylnitromethane*

2,6-dichlorobenzyl chloride (39.2 parts) was added in one portion to a stirred solution of sodium nitrite (15.2 parts) and diethylamine (7.3 parts) in dimethyl sulphoxide (70 parts by volume). There was a rapid rise in temperature which was not controlled. After 1.5 hours the brown reaction mixture was filtered, to remove inorganic material (11.6 parts). The filtrate was distilled under 0.5 Torr. pressure from a waterbath, the temperature of which was gradually raised to 65° C. The brown residue (42.8 parts) was taken up in methylated spirit and added dropwise to a briskly stirred sodium hydroxide (2 N) solution (200 parts by volume) which was then extracted with methylene chloride. The extract was washed with water. After drying on calcium chloride the solvent was evaporated. The residue (16.6 parts) of 2,6-dichlorobenzyl alcohol was contaminated with 2,6-dichlorophenylnitromethane. The combined aqueous phases were acidified with hydrochloric acid and extracted with methylene chloride. The extract was washed with ammonia (1 N) and dried over calcium chloride. The solvent was evaporated leaving an oily residue (15.6 parts) of practically pure 2,6-dichlorophenylnitromethane, which upon treatment with 5 parts by volume of ethanol, storage at —20° C. for two hours and filtration, gave 13 parts of product, melting at 37° to 43.9° C. Yield 38%. (The low yield is attributed to incomplete separation of the nitro compound from the benzyl alcohol.)

*Example VI.—Conversion of 2,6-dichlorobenzyl alcohol into 2,6-dichlorobenzyl chloride*

A mixture of distillates consisting of 26.9 parts of 2,6-dichlorobenzyl alcohol and 36.9 parts of 2,6-dichlorophenylnitromethane (G.L.C. analysis) was dissolved in methylene chloride and 11.5 parts by volume of thionyl chloride added in portions. A vigorous reaction took place. After the initial reaction had ceased the mixture was refluxed for one hour and the solvent then stripped off. Residue 67.3 parts (calculated for 100% conversion of the benzyl alcohol present 66.7 parts). The residue was fractionally distilled at 0.5 Torr. pressure the benzyl halide being obtained in near-quantitative yield.

*Example VII.—Preparation of sodium salt of 2,6-dichlorophenylnitromethane (aci-form)*

2,6-dichlorophenylnitromethane (20.6 parts) prepared according to the process as described in Example I, was dissolved in 50 parts by volume of methanol and treated with a solution of sodium methoxide which was prepared by dissolving 2.3 parts of sodium in 50 parts by volume of methanol. Benzene was then added and subsequently the mixture was distilled until free from alcohol by azeotropic distillation. The precipitated sodium salt was then filtered off, washed with benzene and finally dried to give 24.7 parts of the desired product. Yield 100%.

*Analysis* (percent by weight).—Calculated: Na, 9.4. Found: 9.4.

The sodium salt was found to be very hygroscopic and quickly formed the monohydrate when exposed to the air. This hydrate appeared to be perfectly stable.

2,6-dichlorophenylnitromethane and its sodium salt, are highly active pre-emergence herbicides. This is demonstrated by the results of tests which have been conducted, the results being summarized in Table IV. These tests were conducted as follows:

Aqueous compositions containing acetone (40 volumes), water (60 volumes), Triton X–155 (0.5% by weight per volume) and the active compound in logarithmically varying concentrations were used. Imbibed seeds were planted in sterile compost and the compost was sprayed at a dosage of 50 gallons per acre. Control tests in which seeds were planted in compost and the compost similarly sprayed with the aqueous acetone-Triton X–155 solution only were also carried out. The phytotoxic effect of the active compound was assessed by determining the reduction from the control in fresh weight of stem and leaf of the treated test plants. A regression curve relating growth inhibitions and dosage of the active compound required for 50% and 90% growth inhibition (G.I.) is given in the table. Dosages greater than 10 pounds per acre are indicated by X.

It can be seen from the table that in the soil spray test 2,6-dichlorophenylnitromethane and the sodium salt of the aci-compound, at a dosage of less than 0.9 pound per acre, caused 90% growth inhibition of oats but were much less toxic to the other test seeds. Further tests were carried out to ascertain the effectiveness of these compounds applied pre-emergence in controlling wild oats (*Avena fatua*) in wheat and barley crops. It was found that 2,6-dichlorophenylnitromethane controlled wild oats in barley crops at a dosage of 4 pounds per acre. The compound was too phytotoxic to wheat to be used for controlling wild oats in this crop.

A method of controlling wild oats in a growing barley crop which comprises treating the area where the crop is to be grown, said area containing seeds of wild oat and barley, with 2,6-dichlorophenylnitromethane, preferably at a dosage of about 4 pounds per acre, is a further feature of the invention.

This invention relates further to herbicidal compositions comprising 2,6-dichlorophenylnitromethane or the sodium salt of the aci-compound, a carrier or a surface active agent, or a carrier and a surface active agent.

polyacrylic acids. If necessary, an ionic or non-ionic wetting agent may be incorporated for example, sodium salts of secondary alkyl sulphates available under the registered trademark "Teepol," or sodium dodecylbenzene sulphonate, or an alkyl phenol-polyethylene oxide condensate, (3) As granular or pelleted compositions comprising a suitable solid carrier, for example, a clay, or a resinous or waxy carrier as described above, or a fertilizer or fertilizer mixture,

TABLE IV

| Name | Structure | G.I. level (Percent) | Growth inhibition dose (lb./acre), pre-emergence soil spray | | | | | | |
|---|---|---|---|---|---|---|---|---|---|
| | | | O | RG | SC | P | SB | L | M |
| 2,6-dichlorophenyl nitromethane | Cl–C$_6$H$_3$(Cl)–CH$_2$·NO$_2$ | 50 / 90 | <0.9 / <0.9 | 2.9 / 9.9 | X / X | 5.5 / X | 6.6 / 7.5 | 3.6 / 4.4 | 5.6 / X |
| 2,6-dichlorobenzaldoxime N-oxide, sodium salt, monohydrate (i.e. sodium salt of aciform of the above nitromethane). | Cl–C$_6$H$_3$(Cl)–CH=N(ONa)→O · 1H$_2$O | 50 / 90 | <0.9 / <0.9 | 4.8 / 8.2 | X / X | 5.6 / X | 4.5 / X | 3.4 / 4.2 | 4.6 / X |

O=oats, R.G.=ryegrass, S.C.=sweet corn, P=peas, S.B.=sugar beet, L=linseed, M=mustard.

The term "carrier" as used herein means an organic or inorganic material of synthetic or natural origin with which the active substance is mixed or formulated to facilitate its storage, transport and handling and its application to the plant, seed, soil or other object to be treated. It may be solid or liquid and is preferably biologically and chemically inert. Suitable carriers are the various mineral silicates, particularly clays, synthetic hydrated silicon oxides and synthetic calcium silicates, and resinous or waxy carriers, for example, styrene polymers and copolymers, bitumen, asphaltite or paraffin wax.

Liquid carriers may be solvents or non-solvents for the active material, for example, an organic solvent or a hydrocarbon spray oil, preferably one with an unsulphonatable residue of at least 75%, or an aqueous medium.

The carrier may also be a simple or compound fertilizer which may be solid or liquid, for example an aqueous solution.

The carrier may be mixed or formulated with the active material during manufacture or at any stage subsequently and in any proportion. One or more carriers may be used.

The compositions of the invention may be concentrates suitable for transport or storage and containing for example, from 10 to 95% by weight of the active material. These can be diluted with the same or a different carrier to a concentration suitable for application. The compositions of the invention may also be dilute compositions suitable for application, concentrations of 0.01 to 0.5% by weight being in general satisfactory though lower or higher concentrations may be applied if necessary.

The compositions of the invention may be formulated:

(1) As dusts comprising a mixture of the active material and a finely powdered solid carrier, (2) As wettable powders comprising a major proportion of the active material mixed with a dispersion, i.e., deflocculating or suspending agent, which may be ionic or non-ionic and, if desired, a finely divided solid carrier. Examples of suitable dispersing agents are the sodium or calcium salts of high molecular weight sulphonic acids such as of the lignin sulphonic acids derived from sulphite cellulose waste liquors, or the sodium or calcium salts of condensed aryl sulphonic acids, and sodium salts of (4) As a solution in an organic solvent, (5) As an emulsifiable concentrate which is a concentrated solution or dispersion of the active material in an organic liquid, preferably a water-insoluble organic liquid, containing an added emulsifying agent. These concentrates may contain a proportion of water, for example up to 50% by volume based on the total compositions, i.e., a mayonnaise composition. Suitable organic liquids which may be used are petroleum fractions, for example, an aromatic extract of kerosene. The emulsifier may be of the type producing water-in-oil or oil-in-water emulsions.

The compositions of the invention may contain other ingredients, for example, water conditioning agents such as sodium polyphosphates, cellulose ethers, or sequestering agents, other pesticides including other herbicides, or stickers for example, a non-volatile oil.

Aqueous dispersions and emulsions, for example, compositions obtained by diluting the above wettable powders or emulsifiable concentrates with water may also be within the scope of this invention.

We claim as our invention:

1. A process for the preparation of 2,6-dichlorophenylnitromethane comprising reacting 2,6-dichlorobenzyl chloride with an alkali metal nitrite of the group consisting of sodium, lithium and potassium nitrites, at a temperature of from about 20° C. to about 90° C. in the presence of a solvent of the group consisting of dimethylformamide-urea and dimethylsulfoxide and in the presence of an amine containing from 1 to 8 carbon atoms of the group consisting of monoalkyl- and dialkylamines.

2. A process for the preparation of 2,6-dichlorophenylnitromethane comprising reacting 2,6-dichlorobenzyl chloride with sodium nitrite at a temperature of from about 20° C. to about 90° C. in the presence of dimethylformamide and urea as solvent and in the presence of diethylamine.

3. A process for the preparation of 2,6-dichlorophenylnitromethane comprising reacting 2,6-dichlorobenzyl chloride with sodium nitrite at a temperature of from about 20° C. to about 90° C. in the presence of dimethylsulfoxide as solvent and in the presence of diethylamine.

(References on following page)

References Cited by the Examiner

UNITED STATES PATENTS

| | | | |
|---|---|---|---|
| 2,679,538 | 5/54 | Fever et al. | 260—646 |
| 2,791,604 | 5/57 | Blackwood et al. | 260—471 |
| 2,816,909 | 12/57 | Kornblum et al. | 260—478 |
| 3,005,031 | 10/61 | Friedrick | 260—646 |
| 3,014,972 | 12/61 | Handies et al. | 260—644 |
| 3,020,142 | 2/62 | Willard et al. | 71—2.3 |
| 3,038,015 | 6/62 | Kornblum | 260—644 |
| 3,065,066 | 11/62 | McRae et al. | 71—2.3 |

OTHER REFERENCES

Cason, "Organic Syntheses," vol. 37, pp. 44–46 (1957).

Cooke et al., J. Chem. Soc. (London), vol. of 1938, pp. 1024–1026.

Karrer, "Organic Chemistry," 4th ed., pp. 138–140 (1950).

Partridge et al., J. Chem. Soc. (London), vol. of 1949, pp. 1308–1310.

Titov, C. A., vol. 42, pp. 7261–7263 (1948), p. 443.

CHARLES B. PARKER, *Primary Examiner.*

JULIAN S. LEVITT, *Examiner.*